United States Patent [19]

Fujiwara et al.

[11] Patent Number: 4,594,522

[45] Date of Patent: * Jun. 10, 1986

[54] ARMATURE WINDING OF A SPLIT STATOR

[75] Inventors: Kenzo Fujiwara; Norio Takeuchi; Yoji Nakatsuka; Tsuyoshi Horita; Yuji Nakanishi; Shigeru Murasato, all of Kobe, Japan

[73] Assignee: Mitsubishi Denki Kabushiki Kaisha, Tokyo, Japan

[*] Notice: The portion of the term of this patent subsequent to Jun. 10, 2003 has been disclaimed.

[21] Appl. No.: 652,609

[22] Filed: Sep. 20, 1984

[30] Foreign Application Priority Data

Sep. 26, 1983 [JP] Japan .......................... 58-150131[U]
Sep. 26, 1983 [JP] Japan .......................... 58-150132[U]
Sep. 26, 1983 [JP] Japan .......................... 58-150133[U]
Sep. 26, 1983 [JP] Japan .......................... 58-150134[U]

[51] Int. Cl.$^4$ ............................................ H02K 15/00
[52] U.S. Cl. ......................................... 310/42; 310/43; 310/184; 310/259; 310/260; 29/596
[58] Field of Search ................. 310/42, 254, 258, 259, 310/179, 180, 184, 198, 216, 217, 218, 51, 260, 43; 29/596

[56] References Cited

U.S. PATENT DOCUMENTS

| 2,424,299 | 7/1947 | Baudry | 310/51 UX |
| 3,426,224 | 2/1969 | Esters | 310/184 |
| 4,217,510 | 8/1980 | Detinko | 310/258 |
| 4,263,524 | 4/1981 | Diedrichs | 310/184 |

OTHER PUBLICATIONS

"Synchronous Machine", Kaga et al., Tokyo Deni Univ., 12/20/67; pp. 374-375.

Primary Examiner—R. Skudy
Attorney, Agent, or Firm—Leydig, Voit & Mayer, Ltd.

[57] ABSTRACT

The present invention relates to an armature winding of a split stator having a slotted core divided by at least two circumferentially-spaced split lines to facilitate the disassembly and assembly of the split stator. The armature winding comprises armature coils in the slots of the stator core connected to provide poles and arranged to provide a plurality of armature coils divided at the split lines. Connecting and disconnecting means are provided to connect and disconnect the armature coils when the split stator is assembled and disassembled, respectively.

7 Claims, 16 Drawing Figures

4,594,522

ARMATURE WINDING OF A SPLIT STATOR

BACKGROUND OF THE INVENTION

The present invention relates to an armature winding of a split stator for a rotary electric machine adapted to facilitate assembling and disassembling the split stator in a circumferential direction of the rotary electric machine.

When an a.c. rotary electric machine having an armature winding on a stator exceeds a transporting limit on large size, the stator is split in a circumferential direction in order that it may be disassembled for transport. Even when sufficient space cannot be provided to axially insert or withdraw a rotor, the stator is split for the purpose of installing at a field site and checking and maintaining the rotary electric machine.

The armature winding of a conventional split stator is arranged as shown in a sectional view of the split stator in FIG. 1. In FIG. 1, the armature has a three-phase, two-layer lap winding formed of hexagonal-shaped coils for a stator core having two slots for each pole and each phase. Numeral 1 designates a stator core, split in a split plane 1a. Characters X—X designate a split line of the stator. Numeral 2 designates an armature coil inserted into each slot of the stator core 1 and divided into part coils having ends designated 2a and 2b. A solid line designates a U-phase, a broken line designates a V-phase and a chain line designates a W-phase. Numerals 3a and 3b designate the starting end and finishing end of the coil, and numeral 4 designates connecting wires between the adjacent armature coils 2 of the same phase.

In a factory for fabricating a rotary electric machine, the split stators are coupled to become a circle, the armature coils 2 are inserted into the respective slots of the stator core 1 and are connected. The rotor is inserted into and associated with the assembled stator, and the stator is then tested. When the test is finished, the stator is disassembled at the split lines for transportation. The armature coils 2 which cross the split line X—X are removed from the slots. In FIG. 1, six such coils in a section A are thus removed.

In this manner, when the rotary electric machine in which the stator is split is assembled and associated in a field site, the armatrue coils 2 that were removed when the stator was disassembled should be again inserted into the slots of the stator core 1.

FIG. 2 shows a sectional view of the split stator of another conventional rotary electric machine having a three-phase single-layer chain-winding and slots for each pole and each phase. A stator core 1 is split at the split plane 1a. Numerals 5 to 8 designate armature coils, solid lines designate U-phase, broken lines designate V-phase and chain lines designate W-phase. Numerals 5a, 7a and 6b, 8b respectively designate the starting end and the finishing end of the coils.

In order to disassemble the split stator, the armature coils 5, 6 which cross the split line X—X should be removed from the slots. In installing them at a field site, the armature coils 5, 6 should be again inserted into the coupled stator core 1.

As illustrated and described in the examples above, when the split units of the conventional split stator with the armature winding are disassembled, the armature coils which cross the split lines should be removed and when the sections of the split stator are then recoupled, the armature coils which were removed should be again inserted into the coupled stator core. However, the armature coils in both cases are insulated against a high voltage, and the insulation of the armature coil may be damaged whenever the wedges used to secure the coils in the stator core 1 are removed and then attached. The removal and insertion of the armature coils from and into the slots of the stator core may damage the insulation. Further, a large amount of labor and time is required for every disassembling and assembling of the split stator.

It has been proposed as another conventional means for removing the armature coils of the split units of the split stator to allow the lower port coils of the armature coils crossing the split line to remain inserted and only the upper port coils of the armature coils to be removed. However, even this procedure will cause a certain amount of damage to the insulation of the armature coils and requires a large quantity of labor and time. Further, this procedure for removing the part coils cannot be adopted in situations where the rotor cannot be axially inserted and removed.

SUMMARY OF THE INVENTION

It is therefore an object of the present invention to eliminate the above deficiency of the conventional machine and to provide an armature winding of a split stator for a rotary electric machine in which armature coils crossing the split lines of a stator are divided to have at both ends of the stator core a head crossing from one side of a split line to the other side of the split line. The divided armature coils provide part coils having ends on both sides of the split line so that the stator can be disassembled and assembled at the split lines while the divided armature coils remain mounted in the core stator slots without removal, thereby eliminating the damage to insulation of the armature coils.

BRIEF DESCRIPTION OF THE DRAWINGS

In the drawings, the same numerals depict the same or equivalent parts.

DESCRIPTION OF THE PREFERRED EMBODIMENTS

Figure 3:
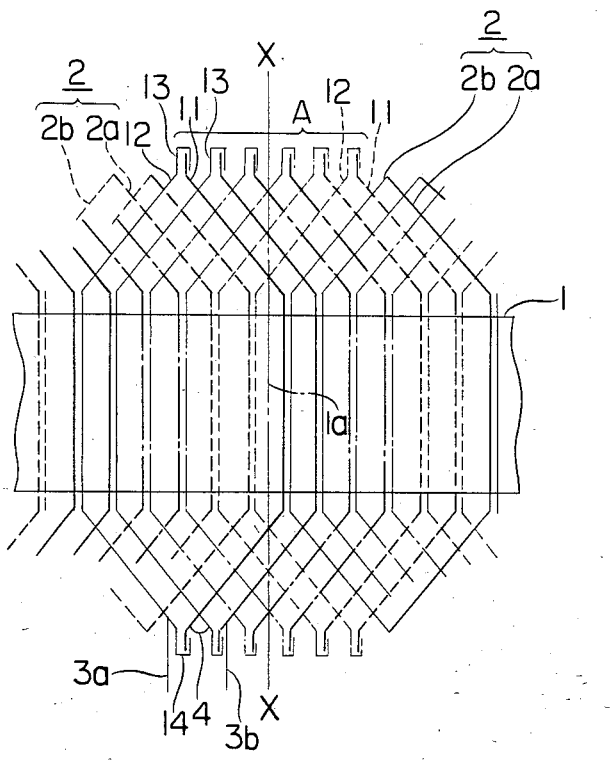
FIG. 3 is a sectional view of an embodiment showing the armature winding of a split stator in accordance with the present invention.

FIG. 3 is a sectional view showing an embodiment of the armature winding of a split stator according to the present invention, illustrating a three-phase, two-layer lap winding hexagonal coil in two slots for each pole and each phase. Numerals 1, 1a, 2, 2a, 2b, 3a, 3b and 4 designate the same parts as those in the conventional armature winding in FIG. 1. Six armature coils crossing the split line X—X in a portion A are divided into part coils having heads 13 and 14 at both ends of the stator core 1. The head 13 includes ends 11 and 12 of the part coils of the armature coils 2 and, similarly, the head 14 includes ends 15 and 16 of the part coils of the armature coils 2. These ends, i.e., 11, 12, 15 and 16, extend radially outwardly and are connected by fasteners illustrated herein as bolts through connecting conductor segments to form an armature coil having heads 13 and 14.

Figure 4:
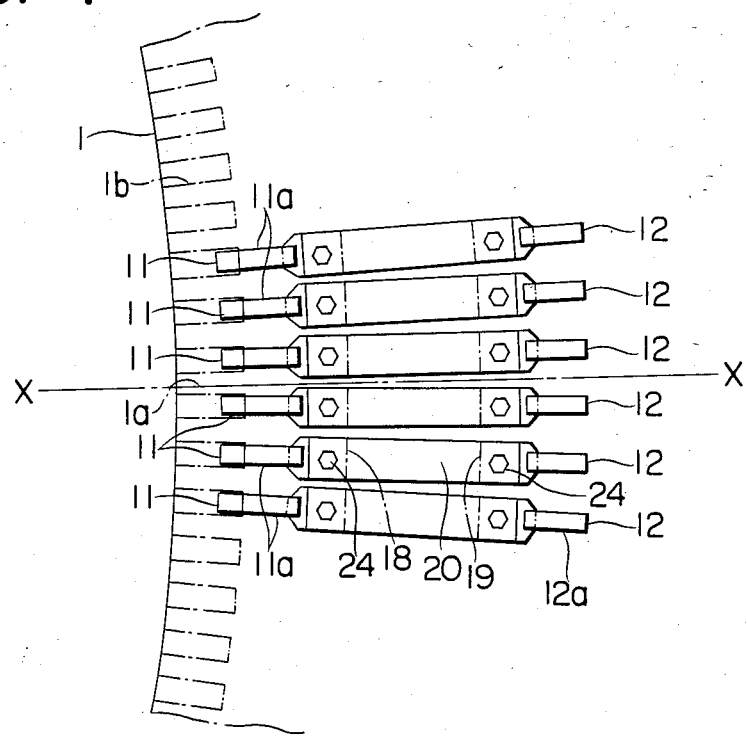
FIG. 4 is a front view showing the essential part of the armature winding of the FIG. 3.
Figure 5:
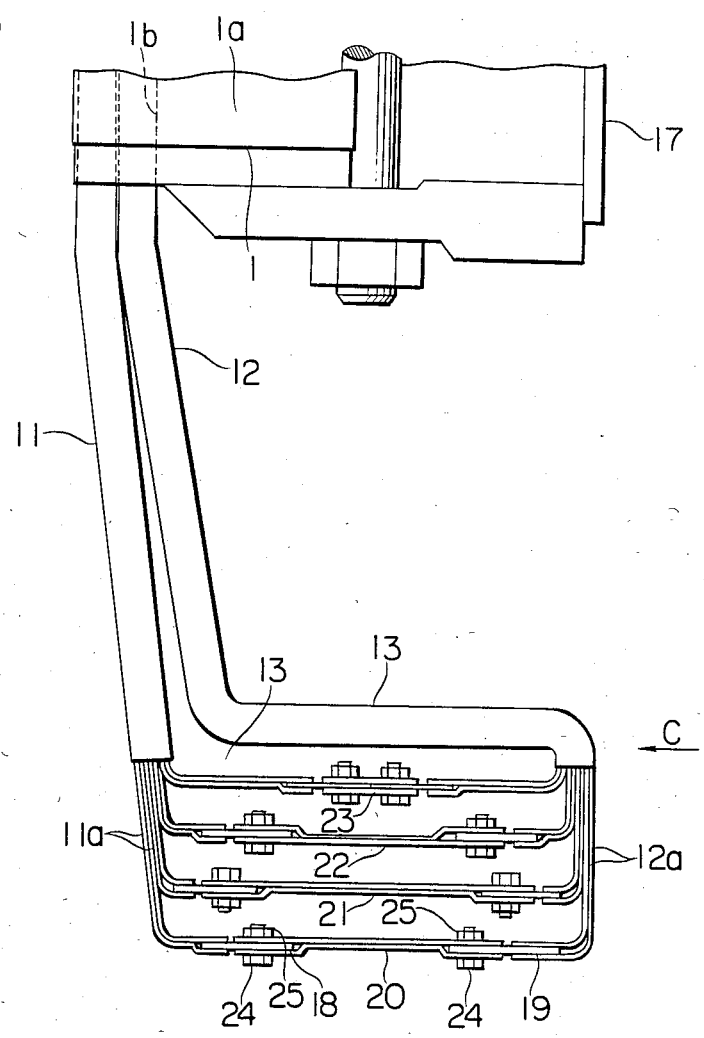
FIG. 5 is a plan view, taken along the dividing line X—X of FIG. 4.
Figure 6:
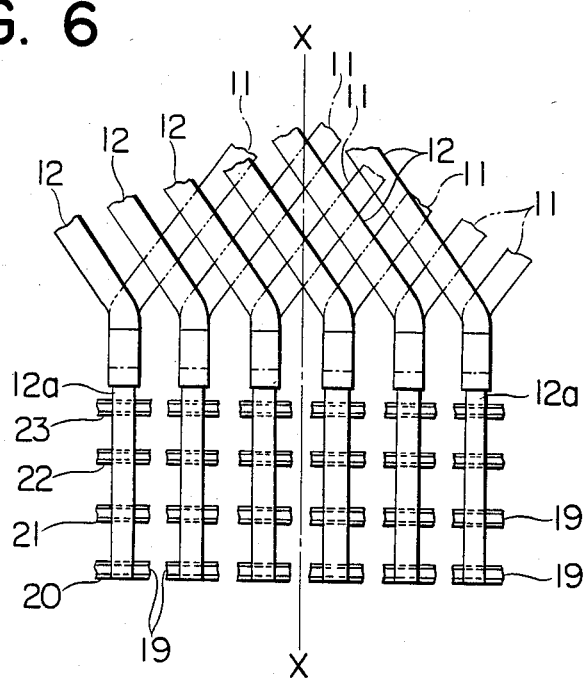
FIG. 6 is a view of the winding of FIG. 5 as seen from a direction C.

Various views of the embodiment showing the divided armature coils 2 and their connecting conductors are illustrated in FIGS. 4–6. In these figures, only head 13 of the armature coils 2 divided by the split line X—X is shown. As can be seen, numeral 17 designates a stator frame for holding the stator core 1 and split by the split line X—X. The armature coils respectively crossing the split lines X—X are divided into part coils having heads 13 and 14 (the drawings show one head 13), and the coil conductors 11a of the ends 11 are radially outwardly bent. The coil conductors 12a of the ends 12 are radially outwardly bent, then further folded inwardly, and opposed to the coil conductors 11a of the ends 11. Numerals 18 and 19 designate connecting pieces brazed to the coil conductors 11a and 12, and 20 to 23 designate conductor pieces connected between the corresponding connecting pieces 18 and 19 and respectively clamped by bolts 24 and nuts 25. These bolts 24 and nuts 25 serve as conducting fasteners and are sufficiently isolated from the adjacent armature coils to maintain the insulating distance between the coils and still facilitate quick connection and removal of the armature coils.

Figure 7:
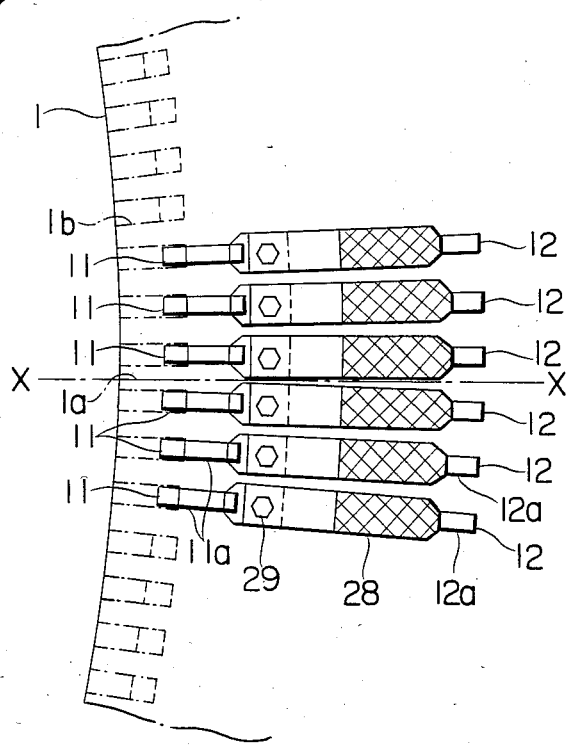
FIG. 7 is a front view showing another embodiment of an armature winding of a split stator in accordance with the present invention.
Figure 8:
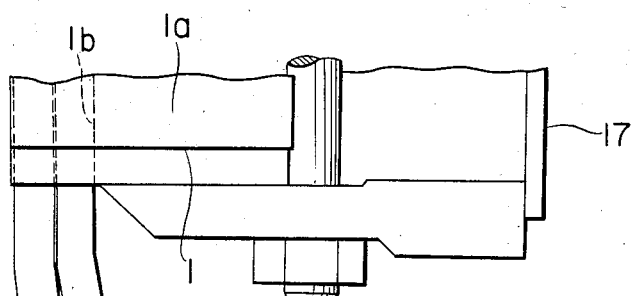
FIG. 8 is a plan view, taken along the split line X—X in FIG. 7.
Figure 8:
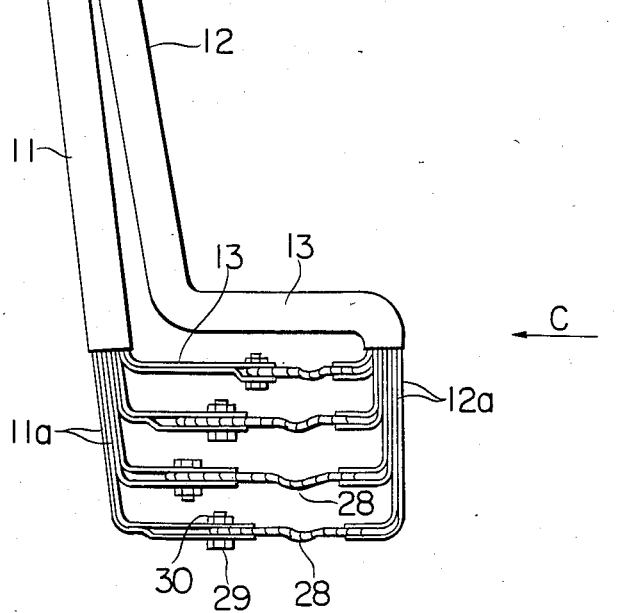
Figure 9:
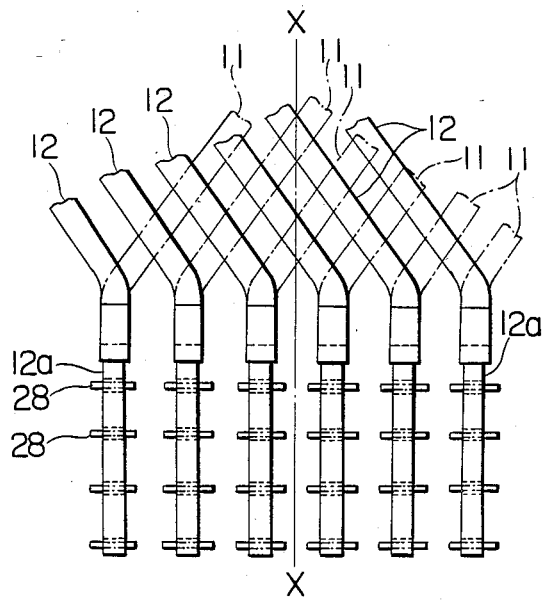
FIG. 9 is a view of the winding of FIG. 8 as seen from a direction C.

FIGS. 7, 8 and 9 show another embodiment of the invention having different conducting fasteners for connecting the divided armature coils. In these figures, numeral 28 designates conductors having deflected portions brazed to the end coil conductors 12a and respectively clamped by bolts 29 and nuts 30. The deflected conductor 28 facilitates the connection between the coil conductors 11a and 12a. These bolts 29 and nuts 30 are sufficiently isolated from adjacent armature coils to maintain the insulating distance between the coils and still facilitate quick connection and removal of the armature coils.

Figure 1:
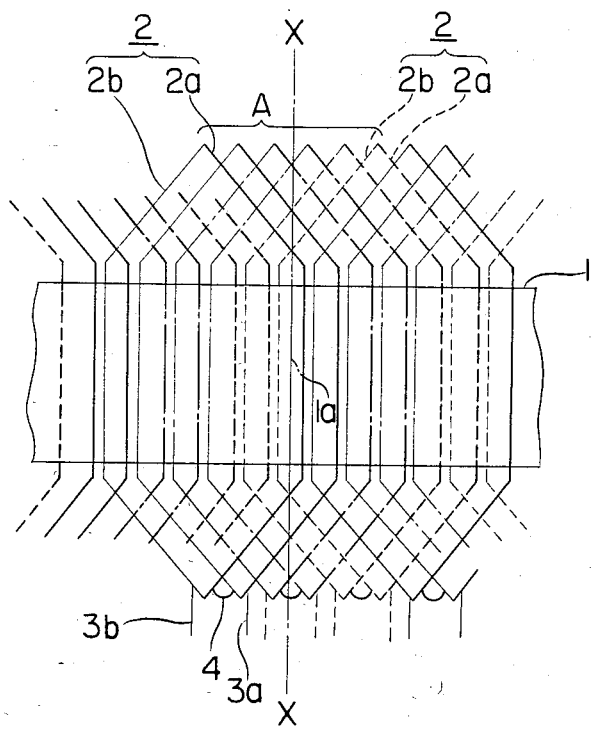
FIG. 1 is a sectional view showing the armature winding of a conventional split stator.
Figure 2:
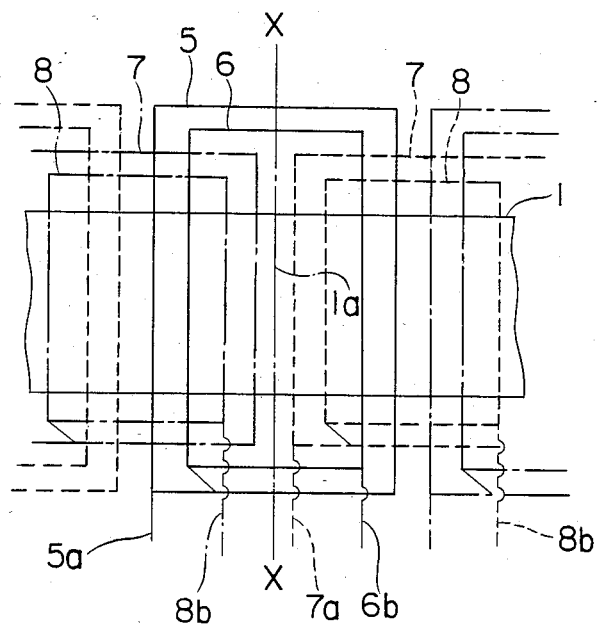
FIG. 2 is a sectional view showing an armature chain-winding of another example of a conventional split stator.
Figure 10:
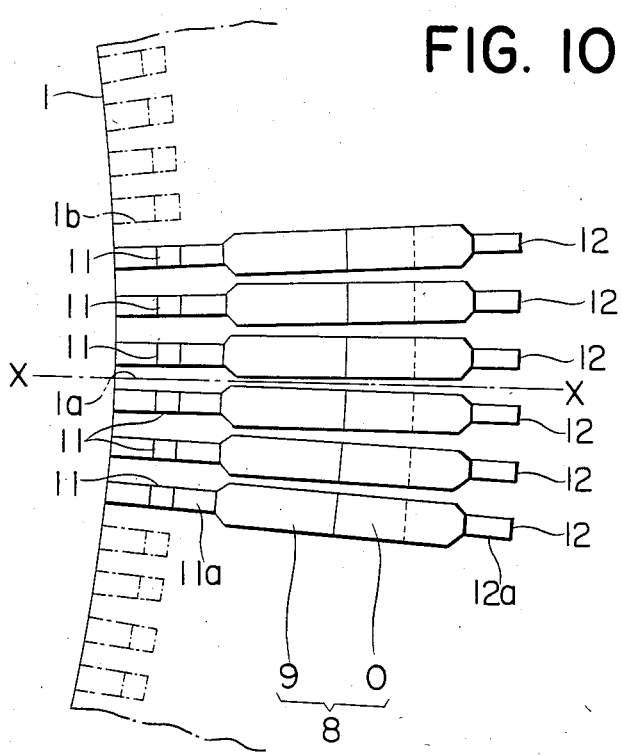
FIG. 10 is a front view showing still another embodiment of an armature winding of a split stator in accordance with the present invention.
Figure 11:
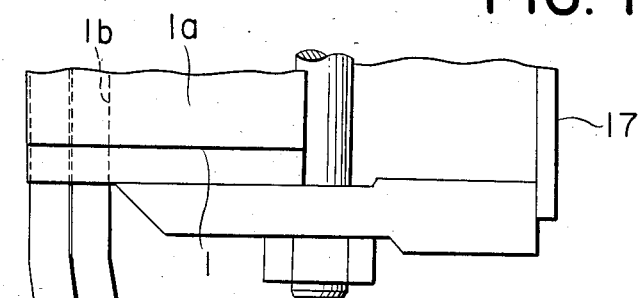
FIG. 11 is a plan view, taken along the split line X—X of FIG. 10.
Figure 12:
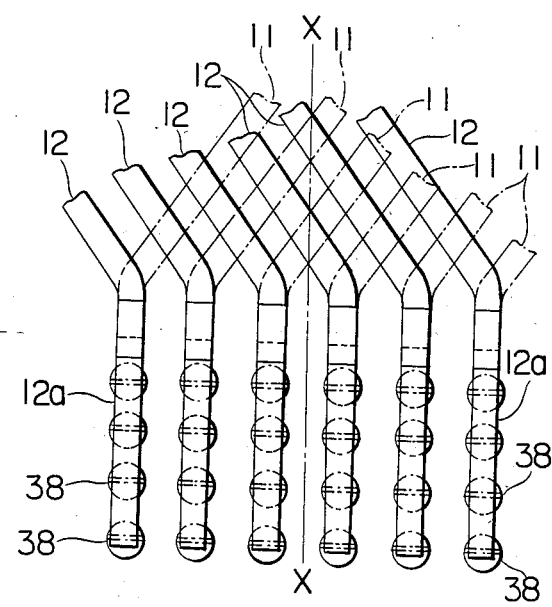
FIG. 12 is a view of the winding of FIG. 11 as seen in a direction C.
Figure 12:
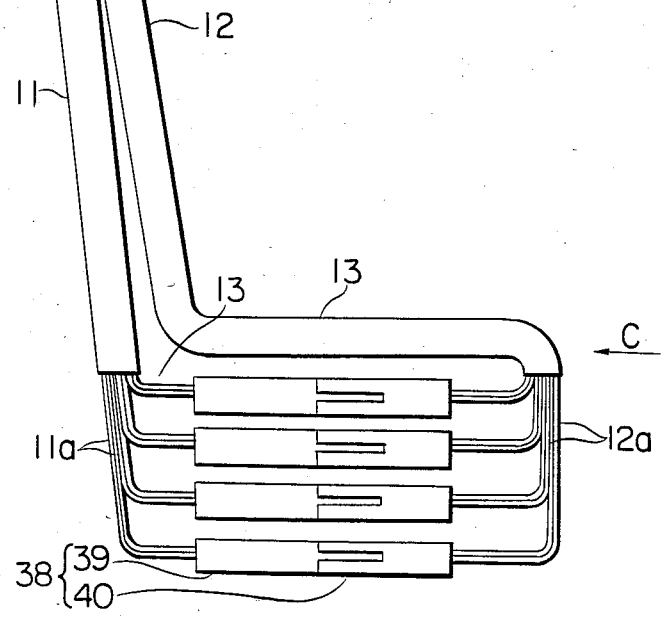

FIGS. 10, 11 and 12 show still another construction for the removable conducting fasteners used in the embodiment shown in FIG. 1. In these figures numeral 38 designate connectors attached correspondingly between the coil conductors 11a and 12a. Each connector includes a plug-in portion 39 brazed to the coil conductor 11a and a receptacle portion 40 brazed to the coil conductor 12a. The plug-in portion 39 is telescopically plugged into the corresponding receptacle portion 40, and provided with a removable stopper constructed to eliminate separation from the receptacle by a vibrations. The connectors 38 are disposed at a sufficient distance from each other for withstanding the voltage therebetween.

Figure 13:
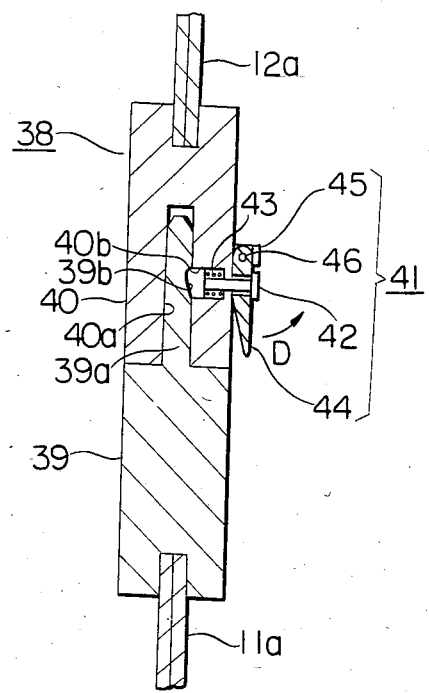
FIG. 13 is an enlarged sectional view showing the detail of a connector of the armature winding in FIG. 10.

An example of a stopper to prevent removable of the connector 38 is denoted as numeral 41 and shown in an enlarged sectional view in FIG. 13. A plug-in piece 39a projected from the plug-in portion 39 is plugged into a slot 40a of the receptacle portion 40, and electrically connected thereto. The stopper 41 consists of a retaining pin 42 movably inserted into a hole 40b formed at the receptacle portion 40, an engaging hole 39b formed at the plug-in piece 39a at the end, and a compression spring 43. The pin 42 is pressed and inserted into the hole 39b by the spring 43 to prevent the plug-in portion 39 from being removed from the receptacle portion 40. Numeral 44 designates a lever supported by a supporting piece 45 fixed to the receptacle 40 through a supporting pin 46 for supporting the retaining pin 42. When the plug-in portion 39 is removed, the plug-in portion 39 is turned in a direction, illustrated herein as arrow D, to remove the pin 42 from the hole 39b.

Figure 14:
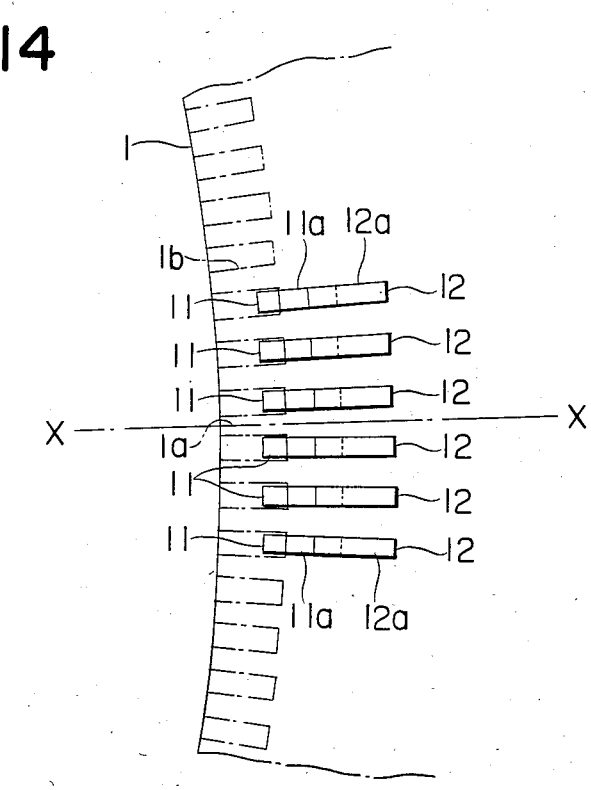
FIG. 14 is a front view showing still another embodiment of an armature winding in accordance with the present invention.
Figure 15:
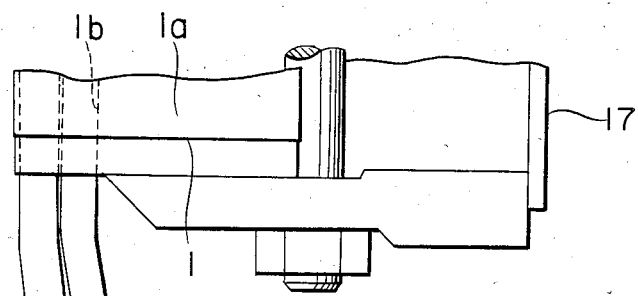
FIG. 15 is a plan view, taken along the split line X—X of FIG. 14.
Figure 15:
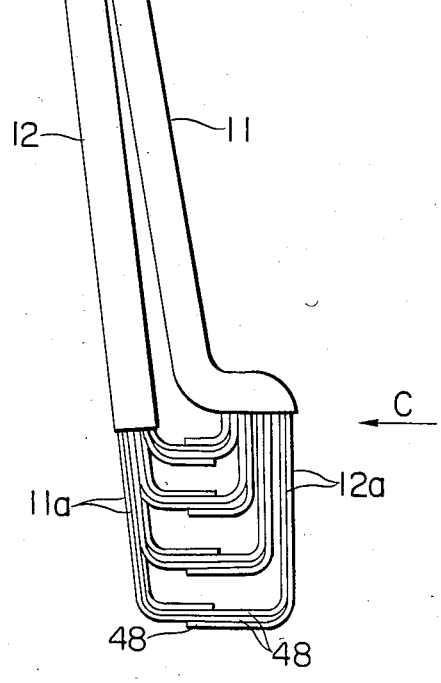
Figure 16:
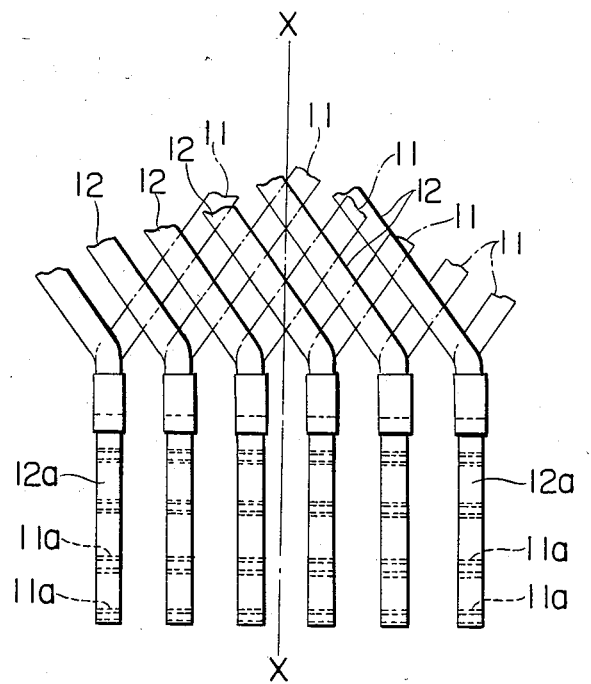
FIG. 16 is a view of the winding of FIG. 15 as seen from a direction C.

FIGS. 14, 15 and 16 show still another embodiment of the invention in which numeral 48 designates an electrically conductive adhesive for rigidly bonding the coil conductors 11a and 12a of the corresponding part coils of the armature coils 2.

This conductive adhesive 48 is prepared by mixing a conductor powder agent having sufficient electric conductivity with an adhesive such as epoxy. The adhesive maintains rigid adhesion in a predetermined temperature range, but weakens its bonding strength when heated to higher temperatures (in a range so as not to obstruct insulators) to separate the coil conductors.

In the embodiments described above, the armature winding is of the type having a three-phase, 2-slot double-layer winding for each pole and each phase. However, the present invention may also be applied to a number of slots other than the 2 slots, more than three-phase and a single-layer hexagonal coil or chain-winding coil.

Further, the splitting of the stator is not limited to two splits but, and may also be applied to more than two splits.

In the embodiments described above, the stator core slots are not inclined to the axial direction. However, the present invention may also be applied to oblique slots at a 1-slot pitch.

In addition, in the embodiments described above, the coil conductors 11a and 12a are radially extended and directionally opposed. However, they may also be axially extended and directionally opposed.

According to the present invention as described above, an armature winding is provided for a split stator in which armature coils crossing the split lines of the stator are split to have a head at both ends and provide part coils having ends that are separably connected to permit the stator to be disassembled and assembled at the split lines while the armature part coils remains in the core slots, thereby allowing disassembling and assembling of the stator without damaging the insulation of the armature coils.

What is claimed is:

1. An armature winding of a split stator having a slotted core divided by at least two circumferentially spaced split lines to facilitate the disassembly and assembly of said split stator, said armature winding comprising armature coils in the slots of said core connected to provide poles and arranged to provide a plurality of said armatures coils divided by each of said split lines, each of said divided armature coils having a head at both ends of said stator core crossing from one side of a split line to the other side of the split line, each of said divided armature coils being divided at a split line into part coils having ends, and means including separable conducting fastener means at both ends of said core for connecting the ends of corresponding part coils when the split stator core is assembled and for disconnecting the ends of corresponding part coils to allow the split stator core to be disassembled without removing armature coils from the split stator.

2. The armature winding of a split stator as claimed in claim 1 wherein said separable conducting fastener means includes means for bolting through connecting conductor pieces attached to the coil ends.

3. The armature winding of a split stator as claimed in claim 1 wherein said separable conducting fastener means includes conductors having deflected portions and removable fasteners for connecting and disconnecting said ends of said armature coils.

4. The armature winding of a split stator as claimed in claim 1 wherein said separable conducting fastener means include connectors having a plug-in portion brazed to one of the coil ends and disposed within a receptacle portion brazed to the other associated coil end.

5. The armature winding of a split stator as claimed in claim 4 wherein said separable conducting fastener means further comprises a removable stopper having a retaining pin movably inserted into a hole formed at said receptacle portion, an engaging hole formed at said plug-in portion, a compression spring depressing said pin to prevent said plug-in portion from being removed from said receptacle portion, and a lever rotatably supported to the outer periphery of said receptacle portion and connected to a rear end of said retaining pin for releasing said retaining pin upon lifting and rotating said retaining pin.

6. The armature winding of a split stator as claimed in claim 1 wherein said separable conducting fastener means includes an electrically conductive adhesive for bonding the ends of the coils upon hardening in a predetermined temperature range and weakening the bonding strength thereof upon heating to a higher temperature for separating the ends of the coils.

7. The armature winding of a split stator as claimed in claim 6 wherein said conductive adhesive is prepared by mixing electrically conductive powder agent with epoxy adhesive.

* * * * *